US012680320B2

(12) United States Patent
Jeon et al.

(10) Patent No.: US 12,680,320 B2
(45) Date of Patent: Jul. 14, 2026

(54) UNMANNED ACCESS FLOOR CONSTRUCTION SYSTEM AND ACCESS FLOOR CONSTRUCTION METHOD USING SAME

(71) Applicant: SAMSUNG C&T CORPORATION, Seoul (KR)

(72) Inventors: Hae Moon Jeon, Seoul (KR); Yunjae Heo, Incheon (KR); Sang Heon Lee, Hwaseong-si (KR); Seongyeong Yang, Seoul (KR); Kun Sub Kim, Seoul (KR); Eunyoung Jung, Suwon-si (KR); Jongeui Song, Seoul (KR); Kye Young Lee, Seoul (KR); Seunghyeok Lee, Seoul (KR); Suengjae Lee, Osan-si (KR)

(73) Assignee: SAMSUNG C&T CORPORATION, Seoul (KR)

( * ) Notice: Subject to any disclaimer, the term of this patent is extended or adjusted under 35 U.S.C. 154(b) by 644 days.

(21) Appl. No.: 18/010,890

(22) PCT Filed: Jun. 15, 2021

(86) PCT No.: PCT/KR2021/007444
§ 371 (c)(1),
(2) Date: Dec. 16, 2022

(87) PCT Pub. No.: WO2021/256816
PCT Pub. Date: Dec. 23, 2021

(65) Prior Publication Data
US 2023/0220686 A1 Jul. 13, 2023

(30) Foreign Application Priority Data
Jun. 16, 2020 (KR) ........................ 10-2020-0073148

(51) Int. Cl.
*E04F 21/20* (2006.01)
*B25J 9/16* (2006.01)
(Continued)

(52) U.S. Cl.
CPC ............. *E04F 21/20* (2013.01); *B25J 9/1687* (2013.01); *B25J 13/006* (2013.01);
(Continued)

(58) Field of Classification Search
CPC ............. E04F 15/024; E04F 15/02405; E04F 15/02447; E04F 21/20; E04F 21/22;
(Continued)

(56) References Cited

U.S. PATENT DOCUMENTS

| | | | | |
|---|---|---|---|---|
| 8,166,727 B2 * | 5/2012 | Pivac | ......................... | B25J 5/00 52/749.11 |
| 8,965,571 B2 * | 2/2015 | Peters | ...................... | B25J 11/00 901/30 |

(Continued)

FOREIGN PATENT DOCUMENTS

| | | | |
|---|---|---|---|
| CN | 110905177 | * | 3/2020 |
| JP | H03-96567 | | 4/1991 |

(Continued)

OTHER PUBLICATIONS

Extended European Search Report for European Application No. 21826104.8, dated Jun. 21, 2024.
(Continued)

*Primary Examiner* — Scott T Baderman
*Assistant Examiner* — Mario M Velez-Lopez
(74) *Attorney, Agent, or Firm* — KILE PARK REED & HOUTTEMAN PLLC

(57) ABSTRACT

According to the present invention, provided is an unmanned construction system for an access floor comprising an installation frame (10), a pad (20) attached to the
(Continued)

installation frame (10), and a floor (30) coupled to the pad (20), the unmanned access floor construction system comprising a construction robot connected to a control server (1) by wired or wireless communication, wherein the construction robot comprises: a pad installation robot (100) for attaching the pad (20) to the installation frame (10); a floor installation robot (200) for mounting the floor (30) on the pad (20); and a bolting robot (300) for fastening the pad (20) to the floor (30) by using a fastening means (40).

15 Claims, 23 Drawing Sheets

(51) Int. Cl.
| | | |
|---|---|---|
| *B25J 13/00* | (2006.01) | |
| *B25J 15/00* | (2006.01) | |
| *B25J 15/06* | (2006.01) | |
| *E04F 15/024* | (2006.01) | |

(52) U.S. Cl.
CPC ....... *B25J 15/0019* (2013.01); *B25J 15/0616* (2013.01); *E04F 15/024* (2013.01)

(58) Field of Classification Search
CPC .. B25J 13/006; B25J 15/0019; B25J 15/0616; B25J 9/1687; B25J 11/00
See application file for complete search history.

(56) References Cited

U.S. PATENT DOCUMENTS

| | | | | |
|---|---|---|---|---|
| 9,074,381 | B1 * | 7/2015 | Drew | E04F 21/1872 |
| 9,358,688 | B2 * | 6/2016 | Drew | B25J 9/0018 |
| 10,274,953 | B1 * | 4/2019 | Agarwal | G05D 1/0027 |
| 12,007,775 | B2 * | 6/2024 | Lee | G05D 1/661 |
| 2006/0251500 | A1 * | 11/2006 | Di Giacomo | E04F 21/20 |
| | | | | 414/459 |
| 2020/0024853 | A1 * | 1/2020 | Furrer | B25J 9/163 |

FOREIGN PATENT DOCUMENTS

| | | | |
|---|---|---|---|
| JP | 06026205 | * | 2/1994 |
| JP | 2018123645 | * | 8/2018 |
| KR | 101454705 | * | 10/2014 |

OTHER PUBLICATIONS

International Search Report for International Application No. PCT/KR2021/007444, dated Sep. 14, 2021.
Written Opinion for International Application No. PCT/KR2021/007444, dated Sep. 14, 2021.

* cited by examiner

100

120

150

140

11  130

300

320

330

300

320

330

UNMANNED ACCESS FLOOR CONSTRUCTION SYSTEM AND ACCESS FLOOR CONSTRUCTION METHOD USING SAME

TECHNICAL FIELD

The present invention disclosed herein relates to an unmanned access floor construction system, and more particularly, to an unmanned access floor construction system capable of constructing an access floor without providing manpower by using a pad installation robot, a floor installation robot, and a bolting robot, each of which has a specific structure for constructing an access floor, and an access floor construction method using same.

BACKGROUND ART

An access floor is a compound word of access (a job of inputting and extracting information in a computer system as a computer term) and a floor (ground). Thus, the access floor is also called a raised floor, a double floor, or O/A floor.

The access floor represents a raised floor suggested to secure a more convenient and efficient office space in the information age in which use of computers is increasing.

In general, since fine or ultra-fine dust or mist has a significant effect on a product quality in a place requiring a clean or super-clean state, such as semiconductor fabs, TFT-LCD fabs, PDP fabs, pharmaceutical or food manufacturing factories, workshops that produce or assemble optical products or printing or precision devices, and operating rooms, provided is a clean room with a raised floor for maintaining temperature and humidity within a predetermined range through constant temperature and humidity control as well as strictly blocking the outside.

The access floor represents a feature of creating another floor by providing a space having a certain height on a flat floor to satisfy the above-described needs. Also, the access floor is formed so that cables are arranged in the space, and the floor is openable and closeable depending on necessity of rearrangement of the cables.

In general, the access floor is constructed by forming an installation frame and then forming a pad and a floor on the installation frame by a worker.

However, the construction of the access floor corresponds to a work that a professional technician avoids because the installation frame has a height of about 3 m to 9 m, and there is a risk of a worker's falling accident. Thus, training to be a skilled professional technician is substantially difficult.

Also, costs and time required for securing safety are excessively required because a safety net or a lifeline is required for securing safety of a worker. In addition, a worker who installs the floor always undergoes musculoskeletal disorders because the floor is a heavy object having a weight of about 20 kg, and an overall process is prolonged because difficulty of a leveling work of the floor that is a heavy object is extremely high.

DISCLOSURE OF THE INVENTION

Technical Problem

The present invention that is derived to solve the above-described problem of typical access floor construction provides an unmanned access floor construction system capable of preventing occurrence of workplace safety accidents by enabling an automated robot to install a mat and floor without performing a dangerous floor installation work by a worker and a method for constructing an access floor using the same.

The present invention also provides an unmanned access floor construction system capable of reducing construction costs and shortening a construction period by allowing a floor installation location selection and a leveling work to be performed quickly through installation of a mat and floor by a robot and a method for constructing an access floor using the same.

The present invention also provides a method for constructing an access floor, which is capable of securing a certain level of construction quality by constructing most of access floors using a robot.

Technical Solution

According to one aspect of the present invention, an unmanned access floor construction system including an installation frame 10, a pad 20 attached to the installation frame 10, and a floor 30 fastened to the pad 20 includes a construction robot connected to a control server 1 by wired or wireless communication, and the construction robot includes: a pad installation robot 100 configured to attach the pad 20 to the installation frame 10; a floor installation robot 200 configured to mount the floor 30 on the pad 20; and a bolting robot 300 configured to fasten the pad 20 and the floor 30 by using a fastening means 40.

In this case, the pad installation robot 100 may include: a first detection sensor 110 configured to sense an installation position 11 of the pad 20 on the installation frame 10; a first installation arm 120 configured to move the pad 20 to the installation position 11; and a first transportation means 130 configured to move the first installation arm 120.

Also, the unmanned access floor construction system may further include an adhesive supply part 140 configured to supply an adhesive to a bottom surface of the pad 20.

Also, the first installation arm 120 may include: a first gripper 121 configured to suction the pad 20; and a second gripper 122 configured to surround a side surface and a bottom surface of the pad 20 suctioned to the first gripper 121.

Also, the first gripper 121 may use a vacuum suction method, and the second gripper 122 may include: a first guide part 122a protruding from an end of the first installation arm 120 in a downward direction a; and a second guide part 122b extending from the first guide part 122a in an inward direction b, in which the first guide part 122a is hinged with respect to the first installation arm 120.

Also, the second guide part 122b may be: hinged in the inward direction b in a state in which the pad 20 is suctioned to the first gripper 121; and hinged in an outward direction c in a state in which the pad 20 is separated from the first gripper 121.

Also, the pad installation robot 100 may further include a main body 150 to which the first install arm 120 is mounted, the adhesive supply part 140 may be disposed on the main body 150, and a discharge hole 141 through which the adhesive is discharged may be defined in the adhesive supply part 140.

Also, the floor installation robot 200 may include: a transportation unit 210 configured to transport the floor 30 in a loaded state; and an installation unit 220 configured to mount the floor 30 disposed on the transportation unit 210 to the pad 20.

Also, the installation unit 220 may include: a second detection sensor 221 configured to sense a mounting position 12 of the floor 30; a second installation arm 222 configured to move the floor 30 to the mounting position 12; and a second transportation means 230 configured to move the second installation arm 222.

Also, the bolting robot 300 may include: a third detection sensor 310 configured to sense an insertion hole 13 to which the fastening means 40 is inserted; a third installation arm 320 configured to move the fastening means 40 to the insertion hole 13; and a third transportation means 330 configured to move the third installation arm 320.

Also, the fastening means 40 may be a bolt 41, the insertion hole 13 may be defined in the pad 20 and the floor 30, and the unmanned access floor construction system may further include a bolting part 340 configured to fasten the bolt 41 to the insertion hole 13.

Also, the construction robot may include: a position sensor 410; and a distance sensor 420.

*According to another aspect of the present invention, a method for constructing an access floor by using the unmanned access floor construction system includes: a first step S100 of constructing the installation frame 10, an elevator 50, and a peripheral slab 60; and a second step S200 of moving the construction robot to the peripheral slab 60 by using the elevator 50.

Also, the method may further include, after the second step S200: a third step S300 of attaching the pad 20 to the frame 10 by using the pad installation robot 100; a fourth step S400 of mounting the floor 30 to the pad 20 by using the floor installation robot 200; and a fifth step S500 of fastening the floor 30 to the pad 20 by inserting the bolt 41 to the insertion hole 13 using the bolting robot 300.

Also, the fourth step S400 may include: an alignment step S410 of allowing the transportation unit 210 and the installation unit 220 to approach the mounting position 12; and a mounting step S420 of lifting the floor 30 loaded on the transportation unit 210 by the second installation arm 222 and mounting the floor 30 to the mounting position 12.

Advantageous Effects

According to the present invention, the occurrence of workplace safety accidents may be prevented by enabling an automated robot to install the mat and the floor without performing a dangerous floor installation work by the worker.

According to the present invention, the construction costs may be reduced, and the construction period may be shortened by allowing the floor installation location selection and the leveling work to be performed quickly through the installation of the mat and floor by the robot.

According to the present invention, a certain level of construction quality may be secured by constructing most of the access floors using the robot.

MODE FOR CARRYING OUT THE INVENTION

Hereinafter, embodiments of an unmanned access floor construction system and a method for constructing an access floor by using the same according to the present invention will be described in more detail with reference to the accompanying drawings and, while describing of the accompanying drawings, the same or corresponding components are given with the same drawing number. Therefore, redundant description thereof will be omitted.

Also, though terms like a first and a second are used to describe various members, components, regions, layers, and/or portions in various embodiments of the present invention, the members, components, regions, layers, and/or portions are not limited to these terms.

When it is described that an element is "coupled to", "engaged with", or "connected to" another element, it should be understood that the element may be directly coupled or connected to the other element but still another element may be "coupled to", "engaged with", or "connected to" the other element between them.

The present invention relates to a system and a construction method, which allow unmanned construction of an access floor.

The access floor constructed by the unmanned access floor construction system according to an embodiment of the present invention includes an installation frame 10, a pad 20 attached to the installation frame 10, and a floor 30 coupled to the pad 20.

The installation frame 10 that is a basic framework allowing the floor 30 to be spaced a predetermined distance from the ground forms a lower space below the floor 30, in which all sorts of equipment is installed and an air-conditioning system is constructed.

The pad 20 is a component that is generally bonded and installed to the installation frame 10, and one corner of the floor 30 is mounted on the pad 20. In general, four corners of the floor 30 are mounted to a top surface of the pad 20.

Figure 23:
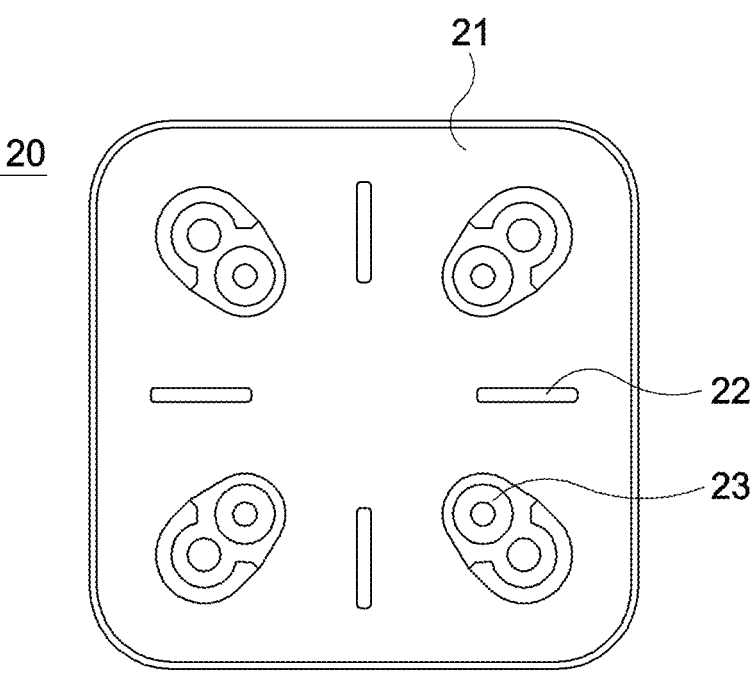
FIG. 23 is a plan view illustrating the pad used for unmanned access floor construction according to an embodiment of the present invention.

The pad 20 may include a mounting part 21 to which the corner of the floor 30 is mounted, a guide part 22 dividing the corners of the floor 30, and a through-hole 23 to which a bolt 41 for fastening the pad 20 to the floor 30 is inserted (refer to FIG. 23).

The pad 20 serves to couple the floor 30 with the installation frame 10 and specify an installation position of the floor 10.

However, since exact leveling and position setting of the floor 30 are difficult when the pad 20 is installed by manpower, there is a problem of performing a complicated process in which the floor 30 is temporarily installed and then removed again, and the pad 20 is bonded. Accordingly, a problem such as a safety accident and strain on a worker's body occurs because much time is consumed for constructing the access floor, and also a worker needs to install the floor 30 two times.

In order to resolve the above-described problem, the present invention allows an unmanned robot to perform an entire process of installation of the pad 20, mounting of the floor 30, and fastening the pad 20 with the floor 30, which are required for constructing the access floor.

The unmanned construction system according to an embodiment of the present invention includes a construction robot connected to a control server 1 by wired or wireless communication.

The construction robot that is an object constructing the access floor is operated and driven by the control server 1. The control server 1 includes an operation module for drive and movement of the construction robot, and the control server 1 may be mounted to the construction robot itself.

Figure 5:
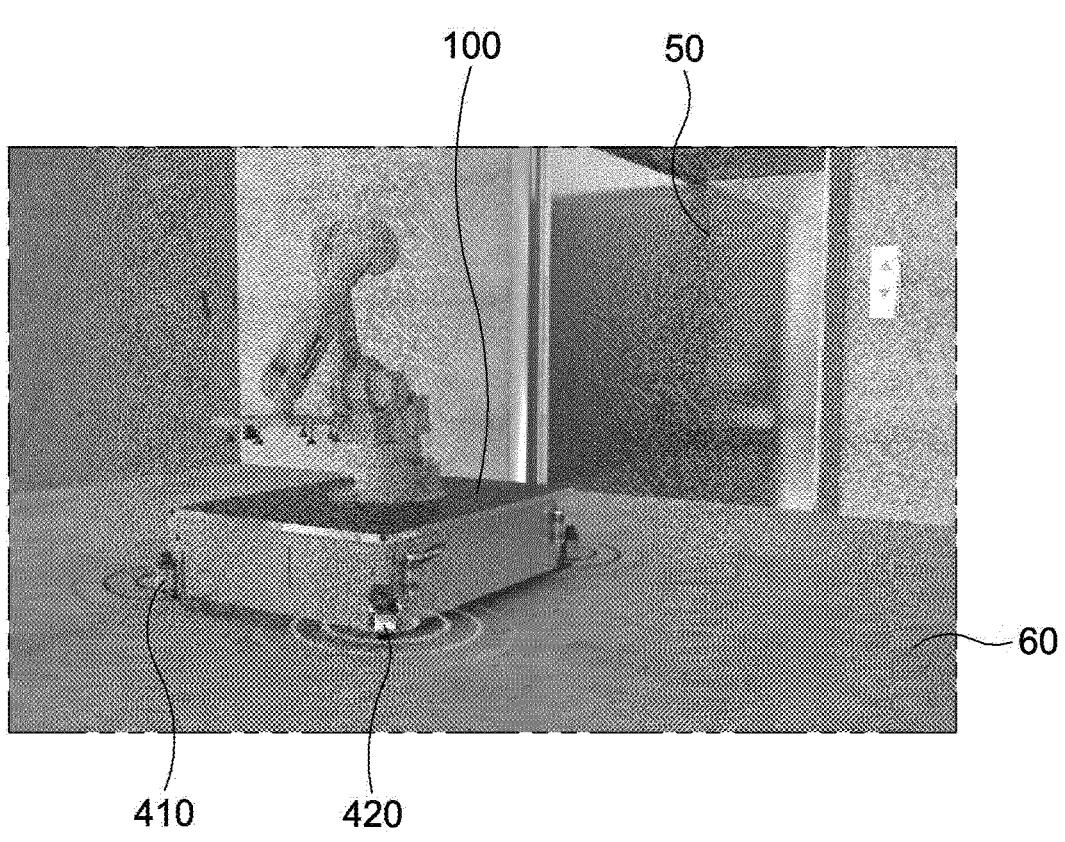
FIG. 5 is a view illustrating a state in which a construction robot is inserted to a peripheral slab through an elevator.

The construction robot may include a pad installation robot 100 for attaching the pad 20 to the installation frame 10, a floor installation robot 200 for mounting the floor 30 on the pad 20; and a bolting robot 300 for fastening the pad 20 to the floor 30 by using a fastening means 40 (refer to FIG. 5).

Figure 1:
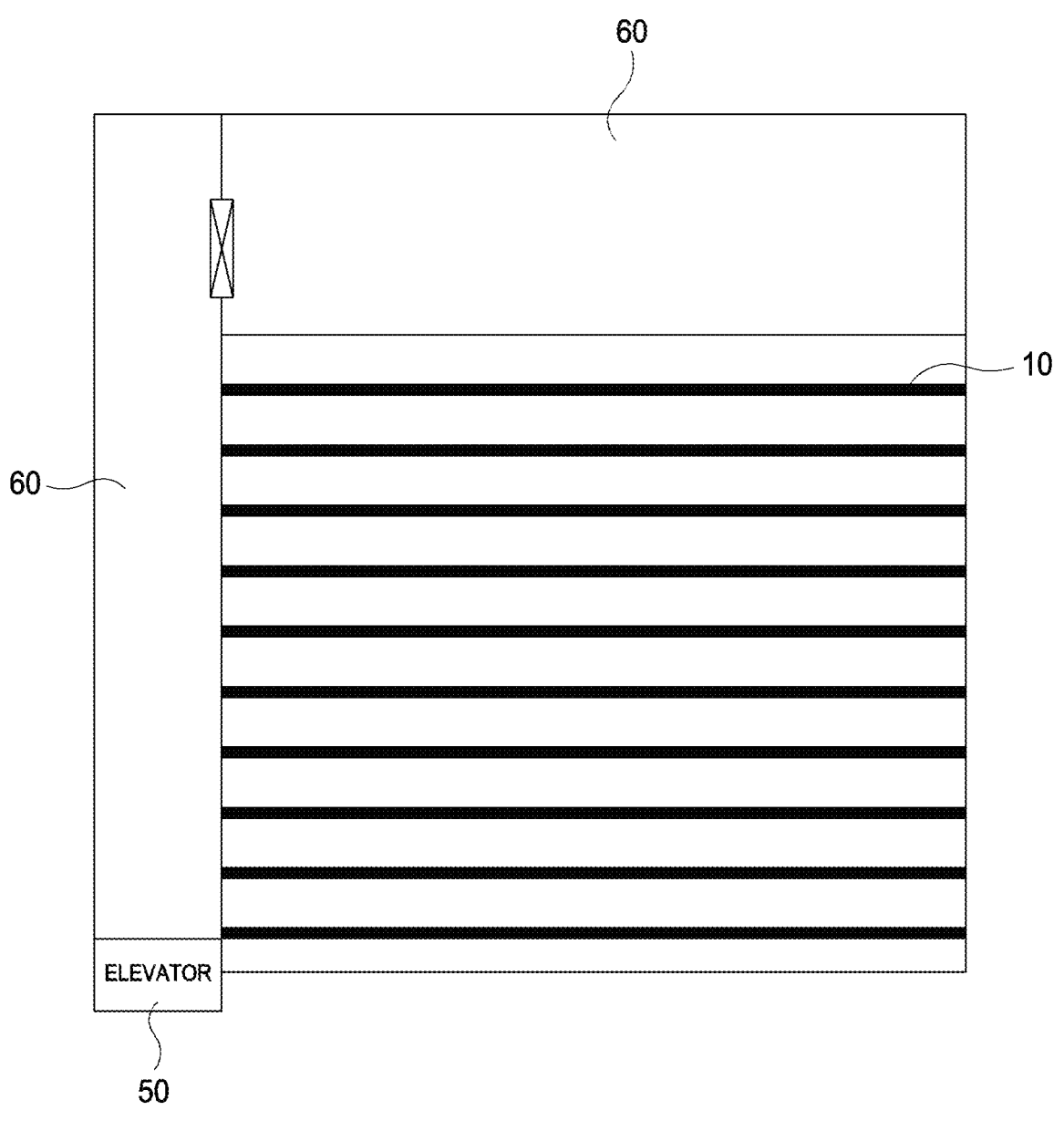
FIG. 1 is a plan view illustrating a configuration of an installation frame, an elevator, and a peripheral slab in a process of constructing an access floor according to an embodiment of the present invention.
Figure 2:
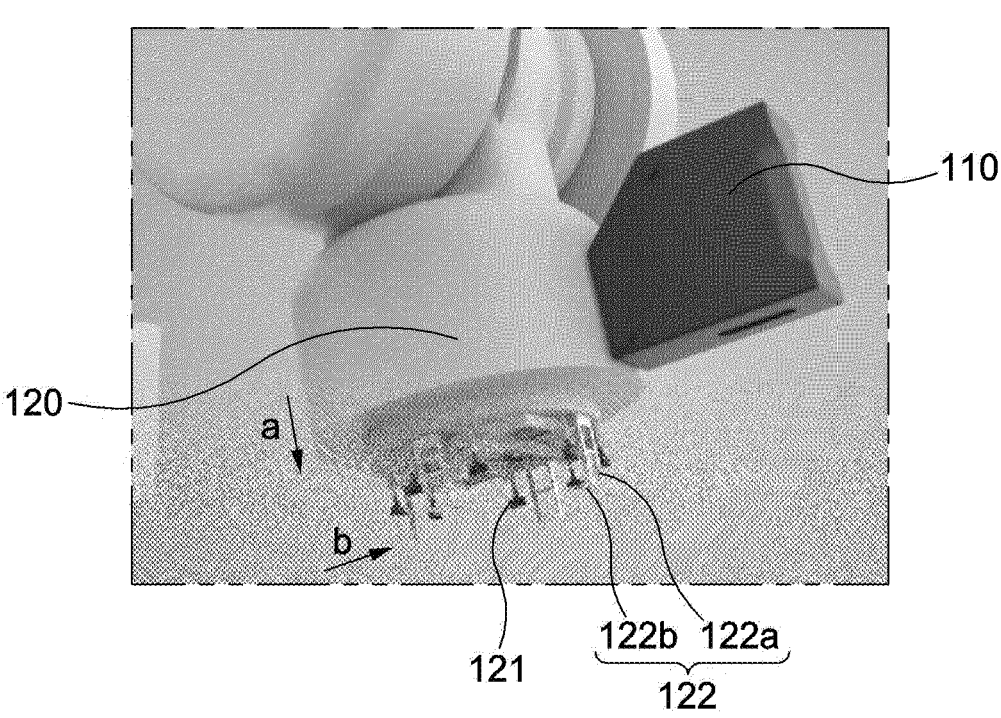
FIG. 2 is detail view illustrating a first installation arm of a pad installation robot according to an embodiment of the present invention.

Specifically, the pad installation robot 100 that is a construction robot for attaching the pad 20 to the installation frame 10 (refer to FIGS. 8 to 11) may include a first detection sensor 110 sensing an installation position 11 of the pad 20 on the installation frame 10, a first installation arm 120 moving the pad 20 to the installation position 11, a first transportation means 130 moving the first installation arm 120, and an adhesive supply part 140 supplying an adhesive to a bottom surface of the pad 20 (refer to FIG. 2).

The first detection sensor 110 includes components such as a vision sensor.

The first installation arm 120 that is a component for gripping and transferring the pad 20 to the installation position 11 may include a first gripper 121 for suctioning and gripping the pad 20 and a second gripper 122 surrounding a side surface and a bottom surface of the pad 20 suctioned to the first gripper 121.

The first gripper 121 suctions and grips one surface of the pad 20 by a vacuum suction method.

The second gripper 122 serves as a safety device that surrounds the pad 20 so that the pad 20 is not separated from the first installation arm 120 when the pad 20 suctioned to the first gripper 121 is separated due to an impact or an error.

To this end, the second gripper 122 may include a first guide part 122*a* protruding from an end of the first installation arm 120 in a downward direction a and a second guide part 122*b* extending from the first guide part 122*a* in an inward direction b.

The first guide part 122*a* may be hinged with respect to the first installation arm 120. In this case, in a state in which the pad 20 is suctioned to the first gripper 121, the second guide part 122*b* is hinged in the inward direction b and surrounds the pad 20 suctioned to the first gripper 121. In comparison, in a state in which the pad 20 is separated from the first gripper 121, the second guide part 122*b* may be hinged in an outward direction c, and the pad 20 separated from the first gripper 121 may be separated from the first installation arm 120.

The pad installation robot 100 may further include a main body 150 on which the first installation arm 120 is mounted. In this case, the adhesive supply part 140 may be disposed on the main body 150, and a discharge hole 141 through which the adhesive is discharged may be defined in the adhesive supply part 140.

The first installation arm 120 grips the pad 20 loaded on a pad loading part 150 and allows the pad 20 to contact the discharge hole 141 so that the adhesive is applied on a contact surface of the pad 20.

Thereafter, the first installation arm 120 transfers the pad 20 so that the contact surface of the pad 20 contacts the installation position 11.

The floor installation robot 200 serves to mount the floor 30 on the pad 20 (refer to FIGS. 12 to 20). In general, the corner of the floor 30 is mounted on the mounting part 21 of the pad 20.

Figure 6:
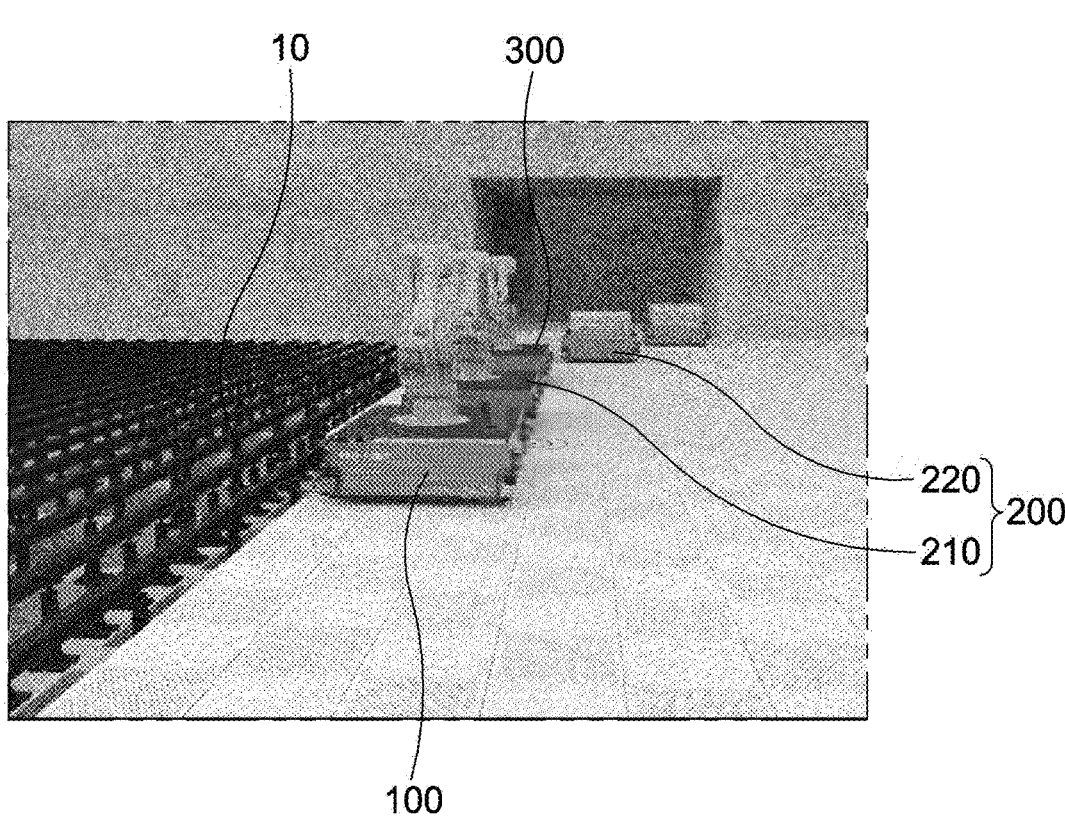
FIGS. 6 and 7 are views illustrating a state in which the construction robot is aligned around the installation frame for construction of the access floor.
Figure 7:
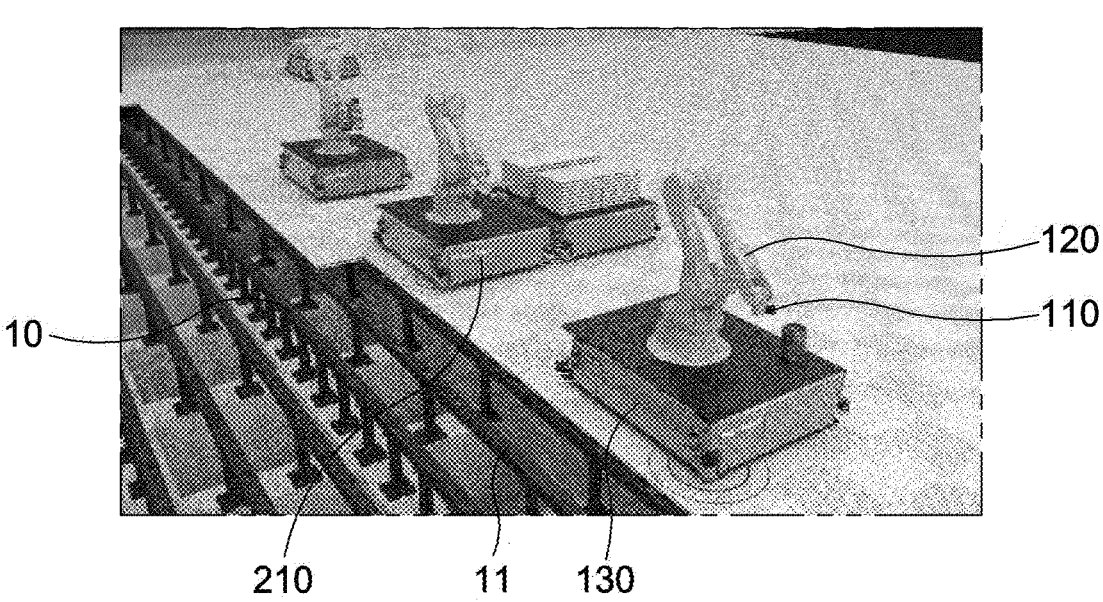
Figure 8:
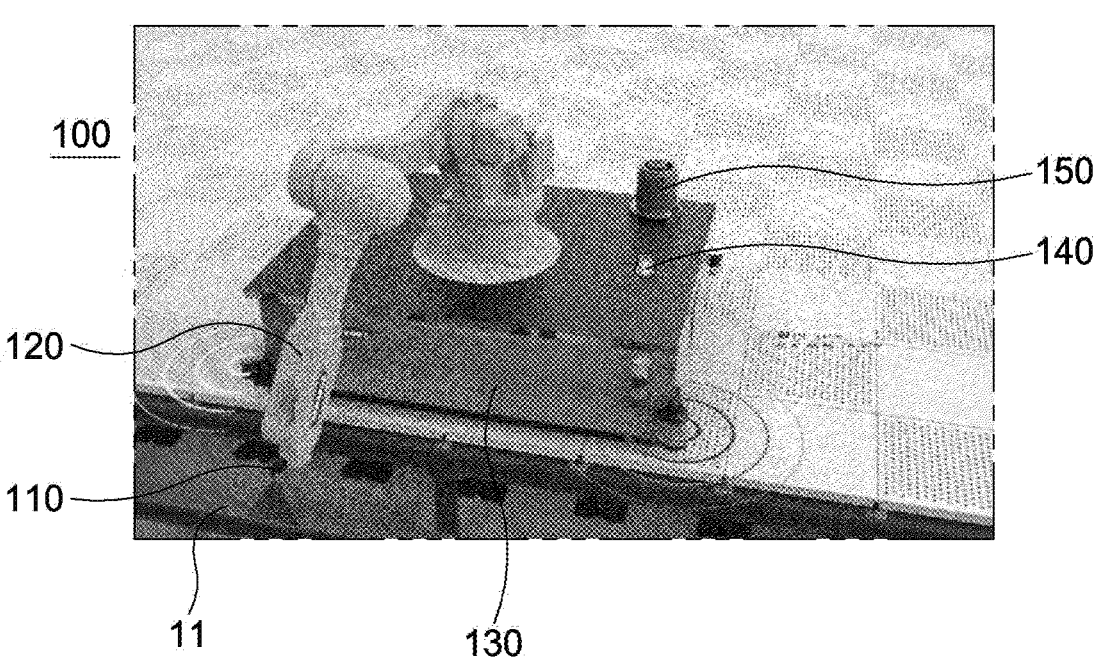
FIGS. 8 to 11 are views illustrating a process in which the pad installation robot attaches a pad to the installation frame.
Figure 9:
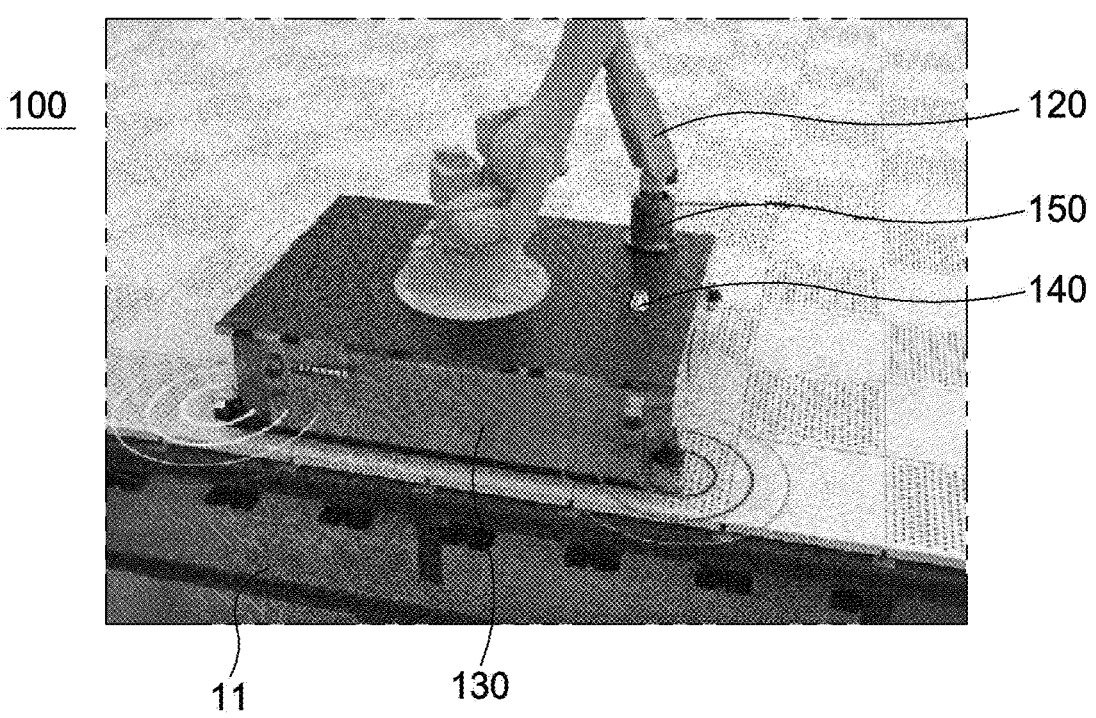
Figure 10:
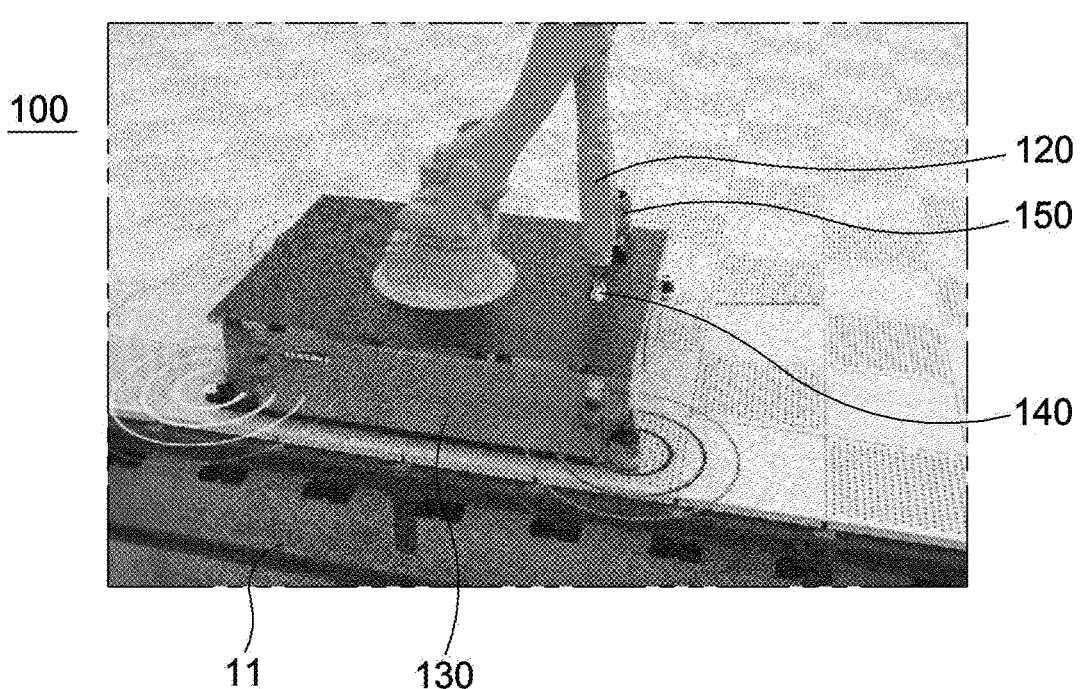
Figure 11:
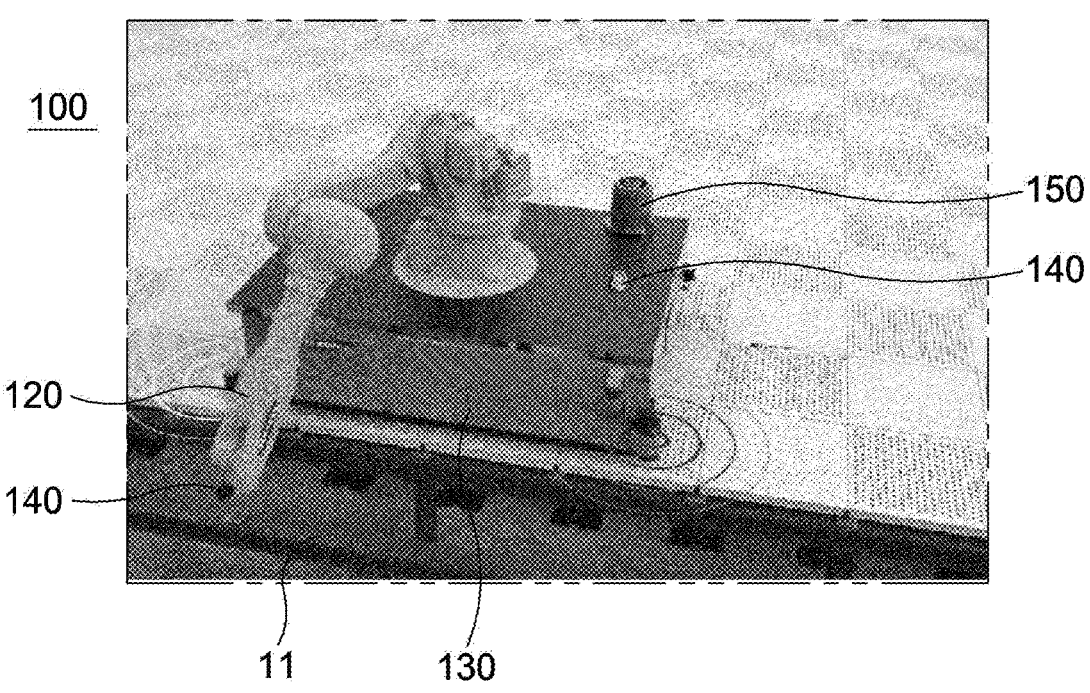
Figure 12:
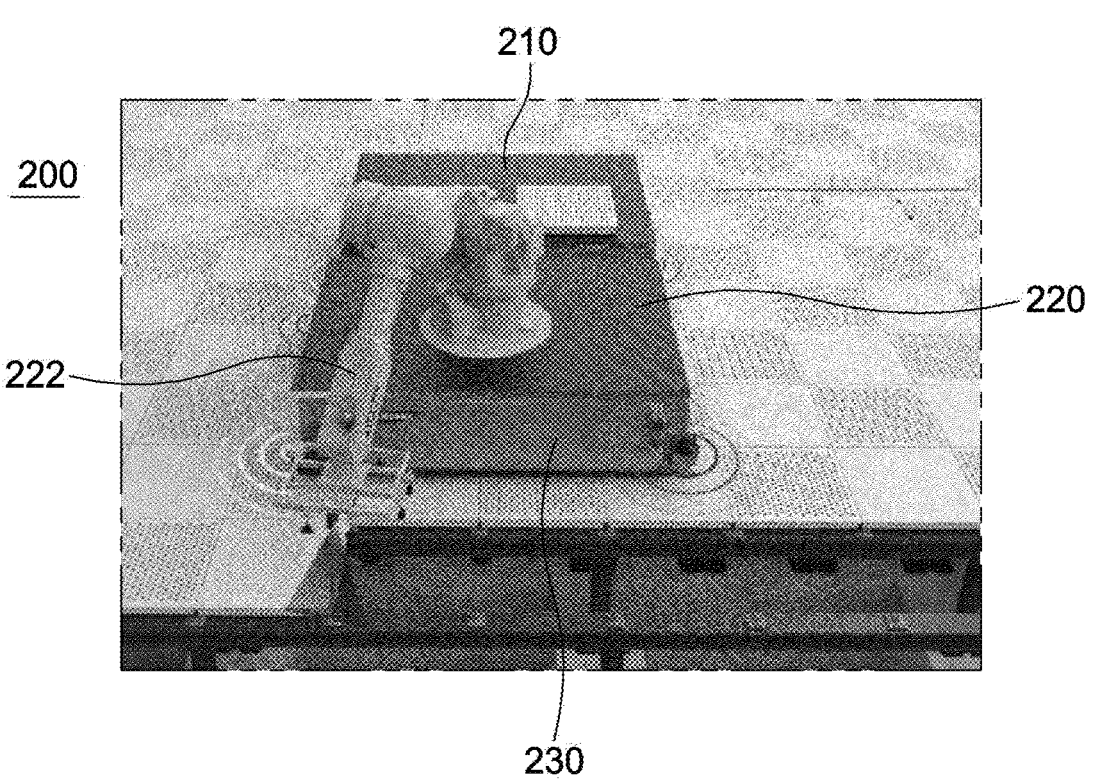
FIGS. 12 to 20 are views illustrating a process in which the floor installation robot mounts a floor on the pad.
Figure 13:
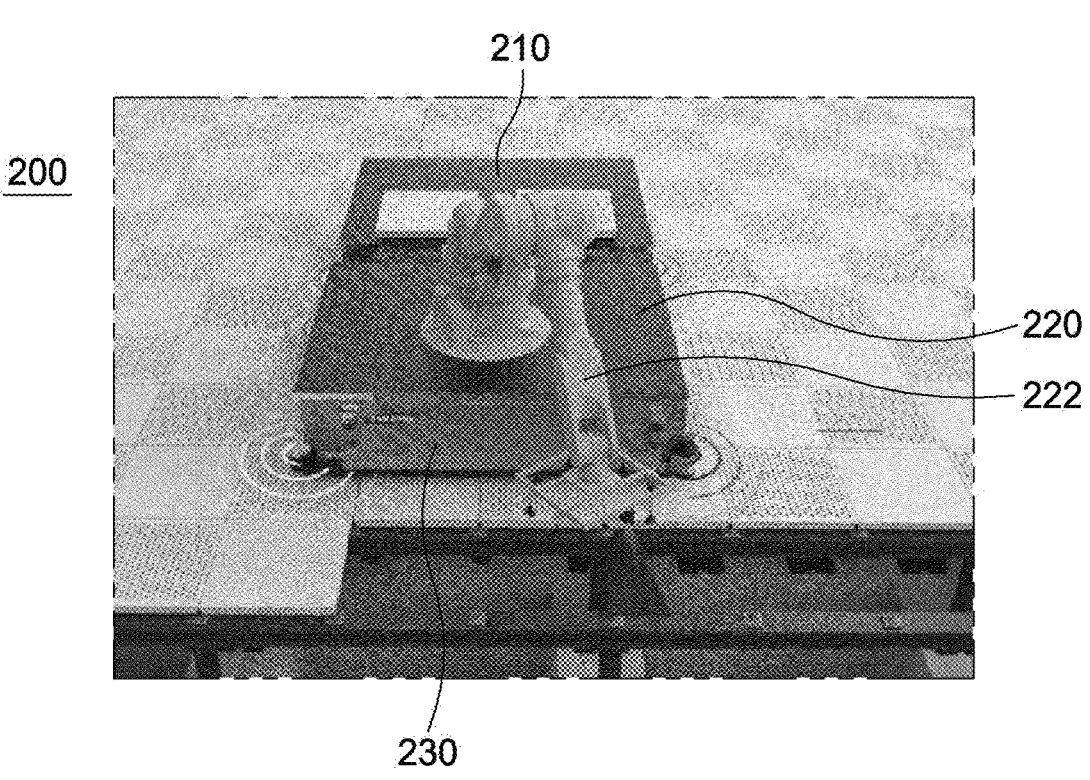
Figure 14:
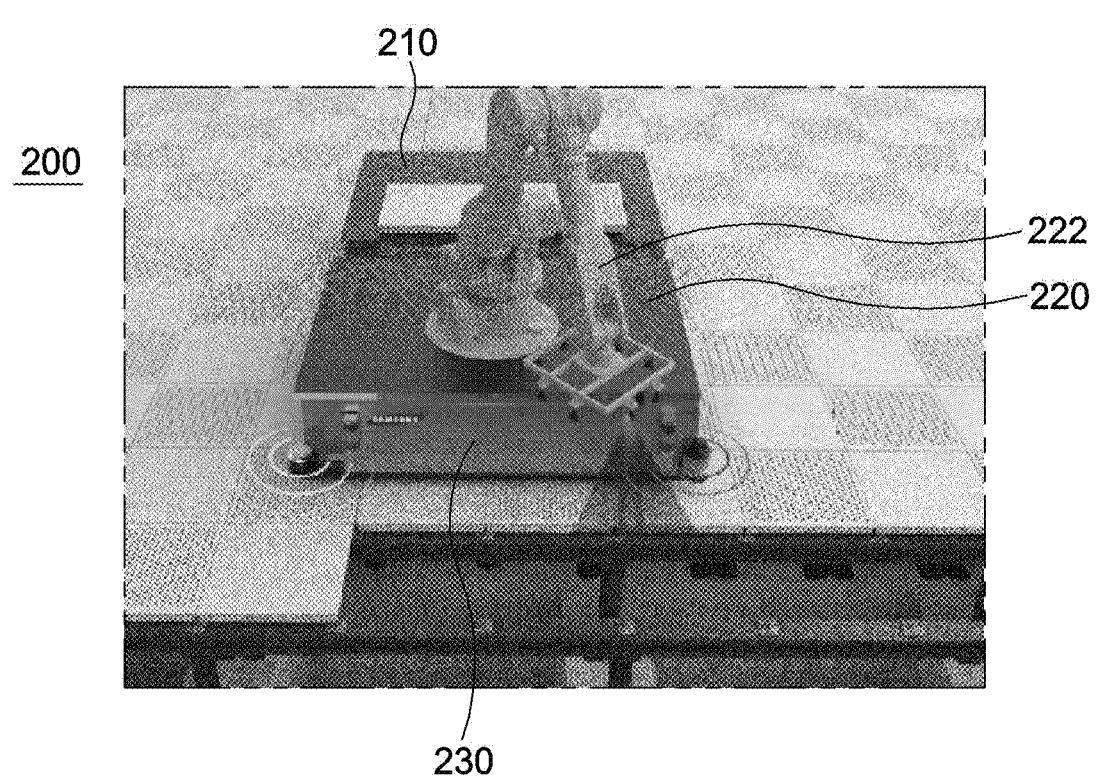
Figure 15:
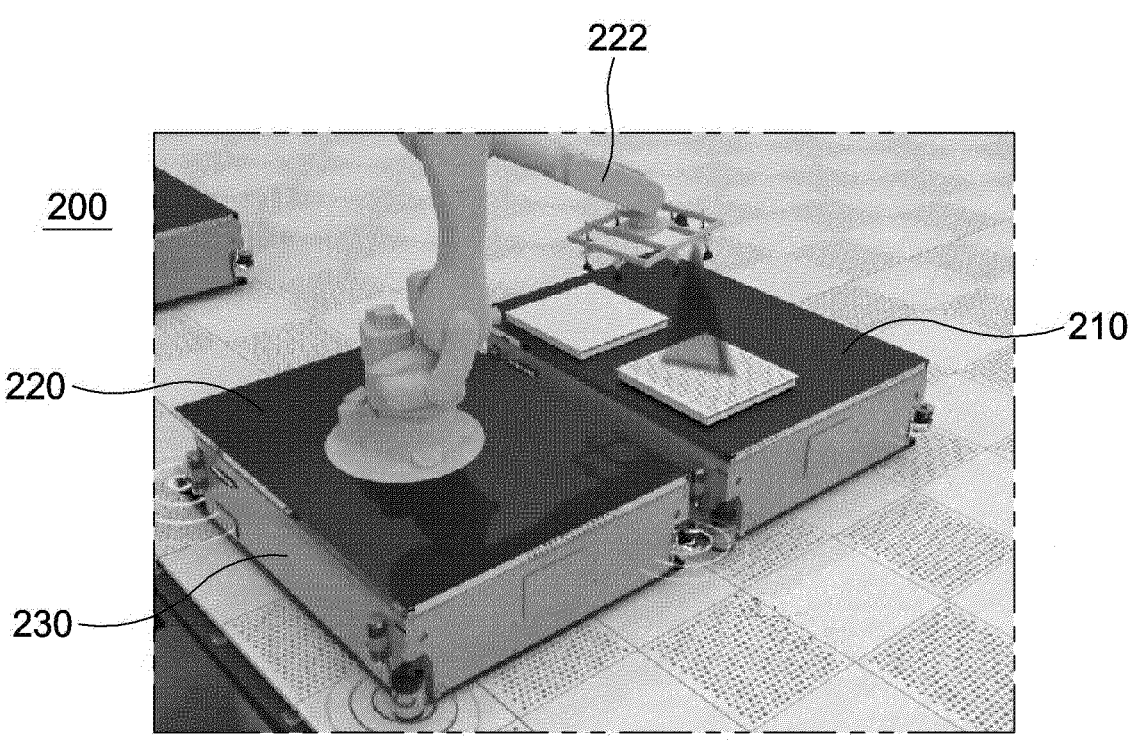
Figure 16:
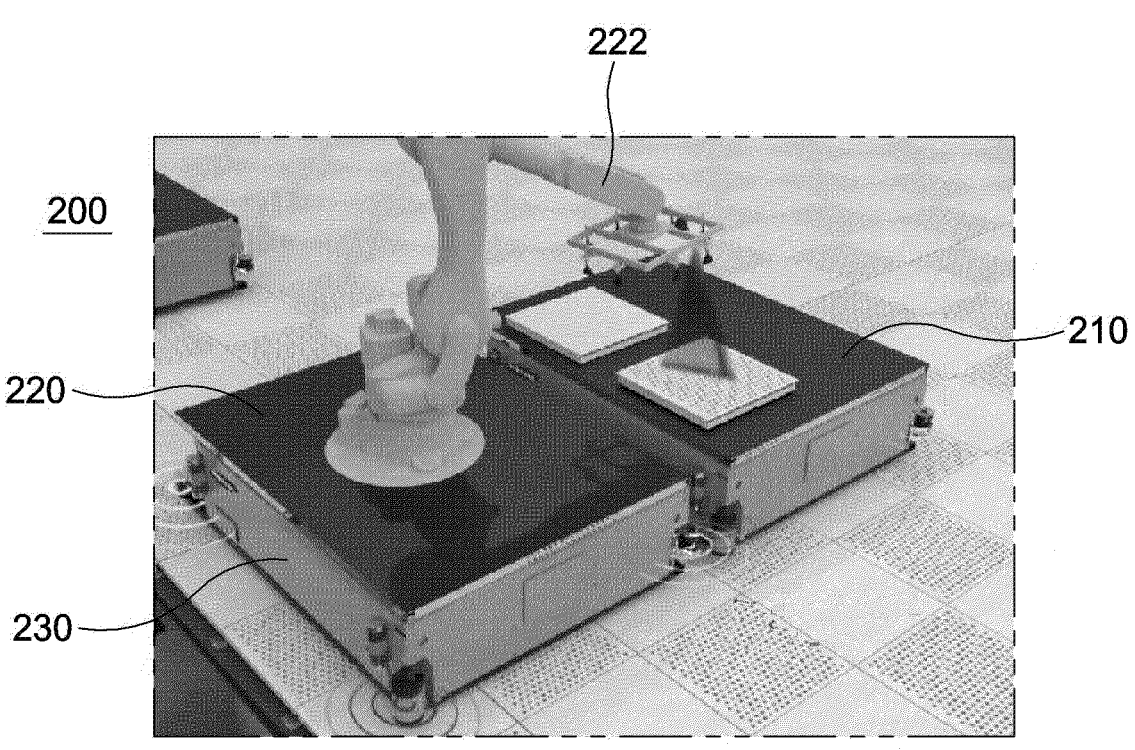
Figure 17:
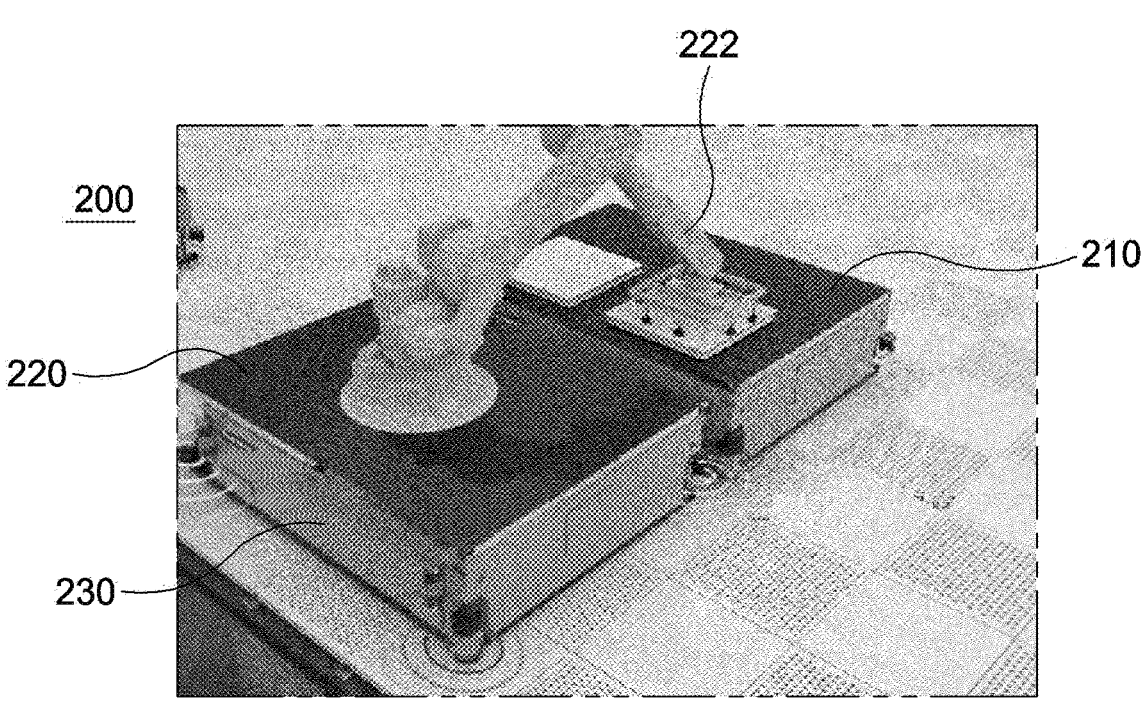
Figure 18:
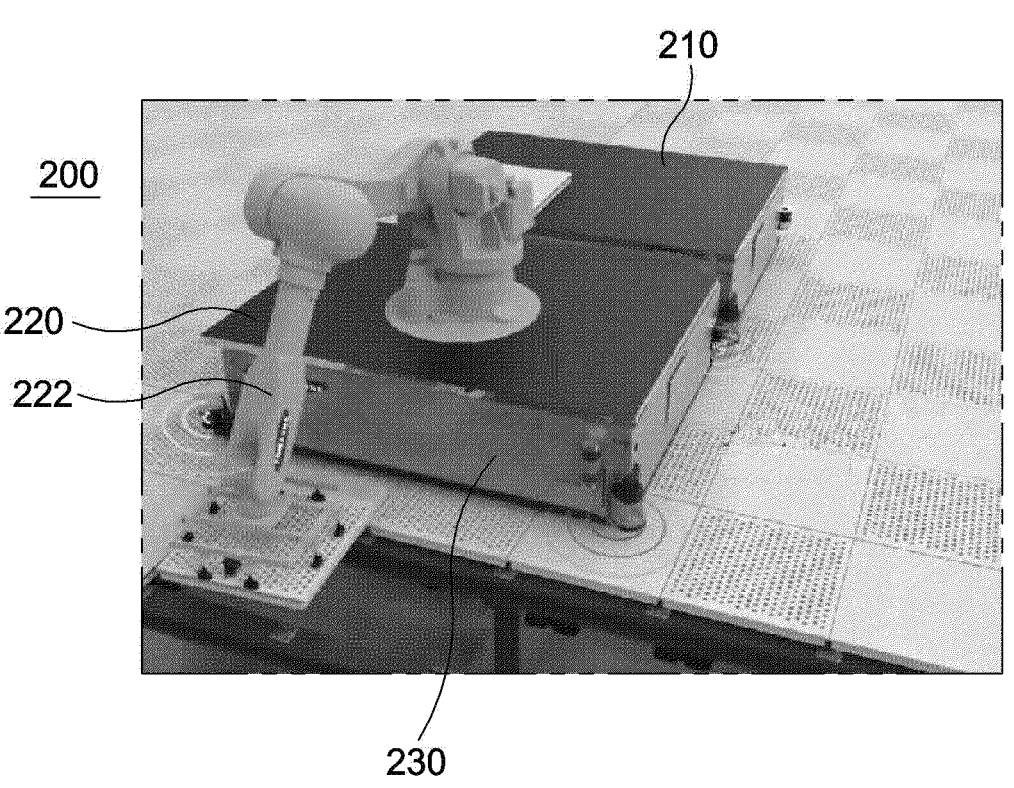
Figure 19:
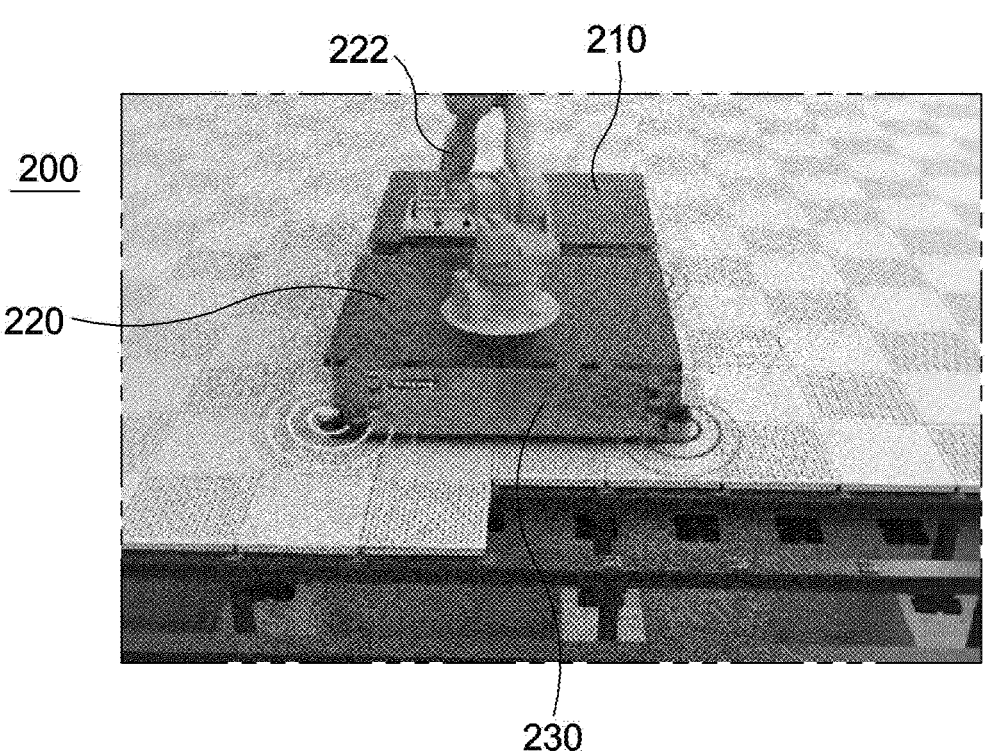
Figure 20:
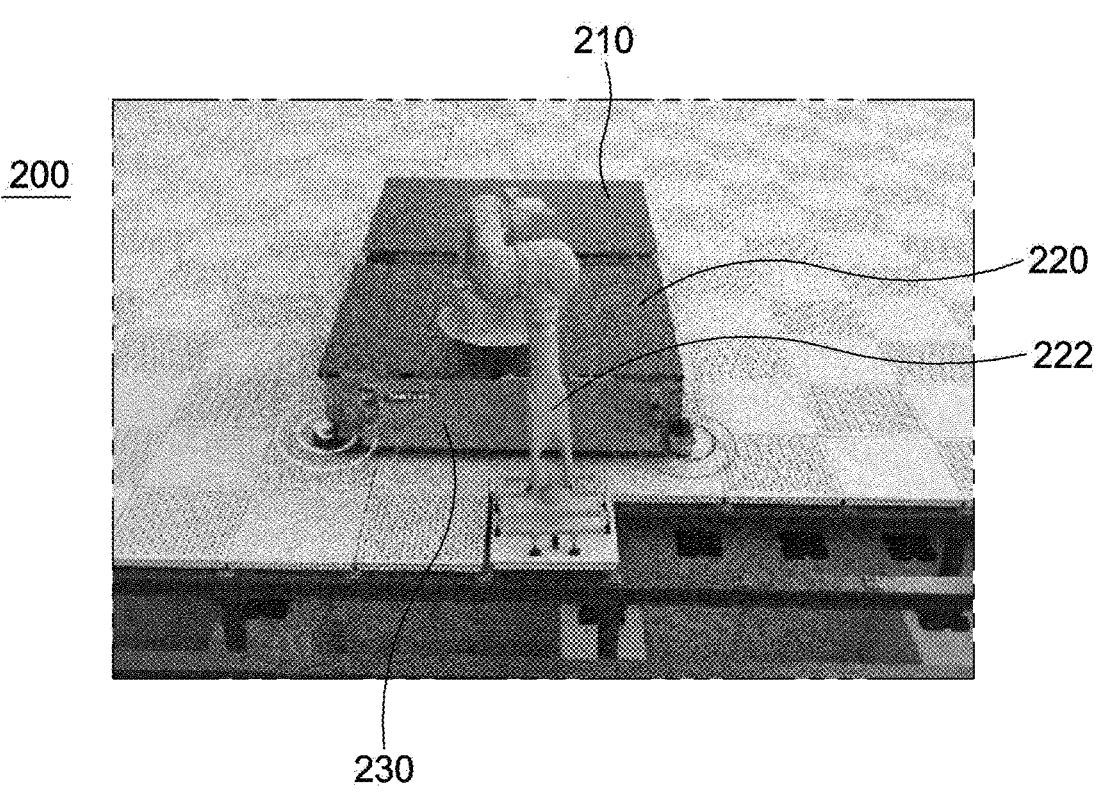

To this end, the floor installation robot 200 may include a transportation unit 210 transporting the loaded floor 30 and an installation unit 220 mounting the floor 30 on the transportation unit 210 to the pad 20 (refer to FIG. 6).

*Since the floor 30 is a large construction material with a heavy weight, when the floor 30 is loaded and transported in one construction robot, a size of the construction robot may increase, and construction efficiency may decrease.

Thus, in the present invention, the transportation unit 210 loading and transporting the floor 30 is separately provided to load and transport the floor 30 around the installation unit 220.

Alternatively, the transportation unit 210 and the installation unit 220 may be integrated into a single unit depending on circumstances.

Figure 3:
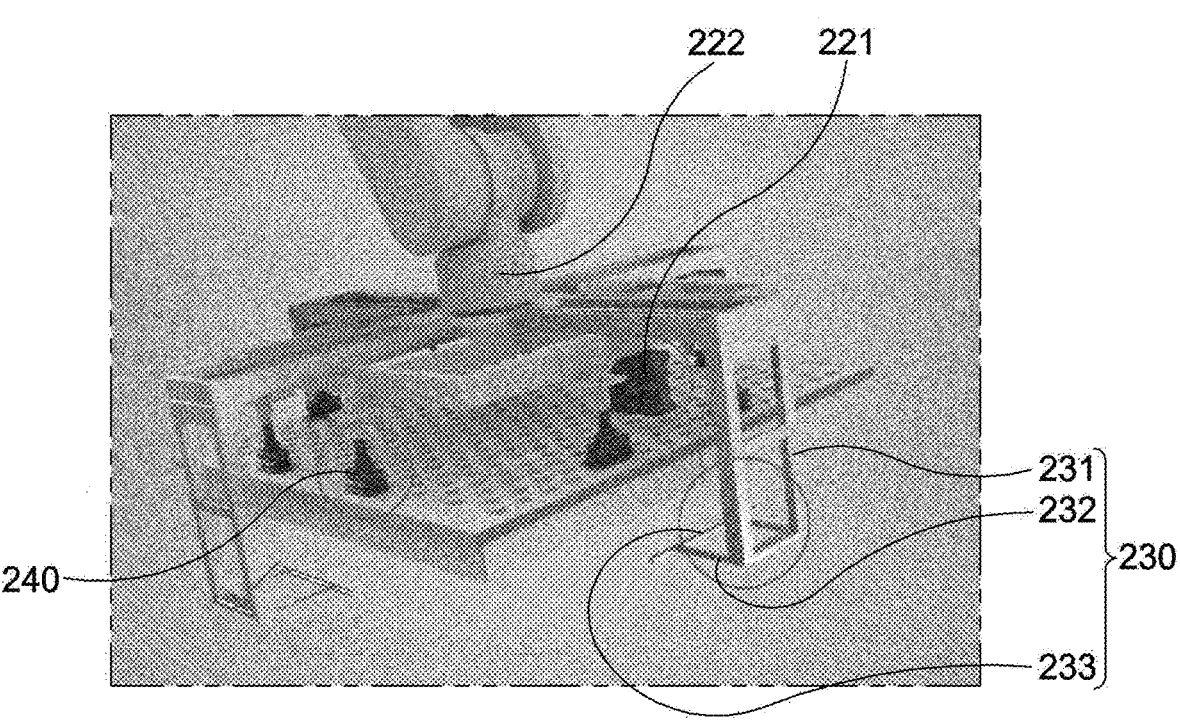
FIG. 3 is detail view illustrating a second installation arm of a floor installation robot according to an embodiment of the present invention.

The installation unit 220 may include a second detection sensor 221 sensing a mounting position 12 of the floor 30, a second installation arm 222 moving the floor 30 to the mounting position 12, and a second transportation means 230 moving the second installation arm 222 (refer to FIG. 3).

Components corresponding to the first gripper 121 and the second gripper 122 of the above-described pad installation robot 100 may be also formed on the second installation arm 222 of the installation unit 220, and in this case, an object to be installed is changed from the pad 20 to the floor 30.

Figure 21:
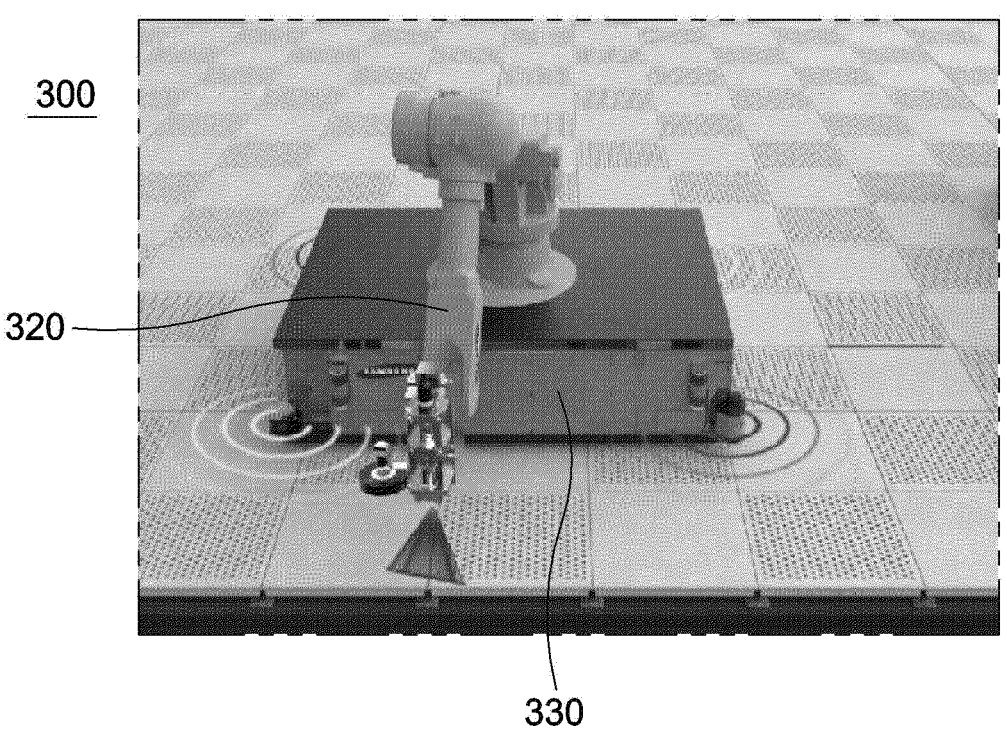
FIGS. 21 to 22 are views illustrating a process in which the bolting robot fastens the pad and the floor by using a fastening means.
Figure 22:
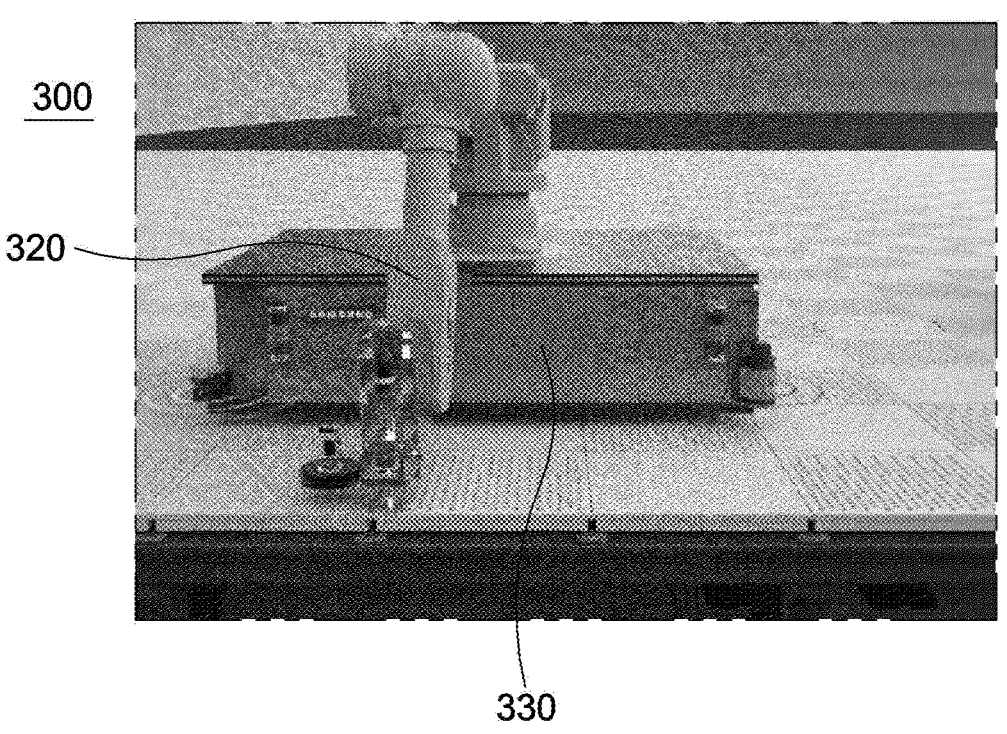

The bolting robot 300 serves to fasten the floor 30 to the pad 20 by using the fastening means 40 (refer to FIGS. 21 to 22).

Figure 4:
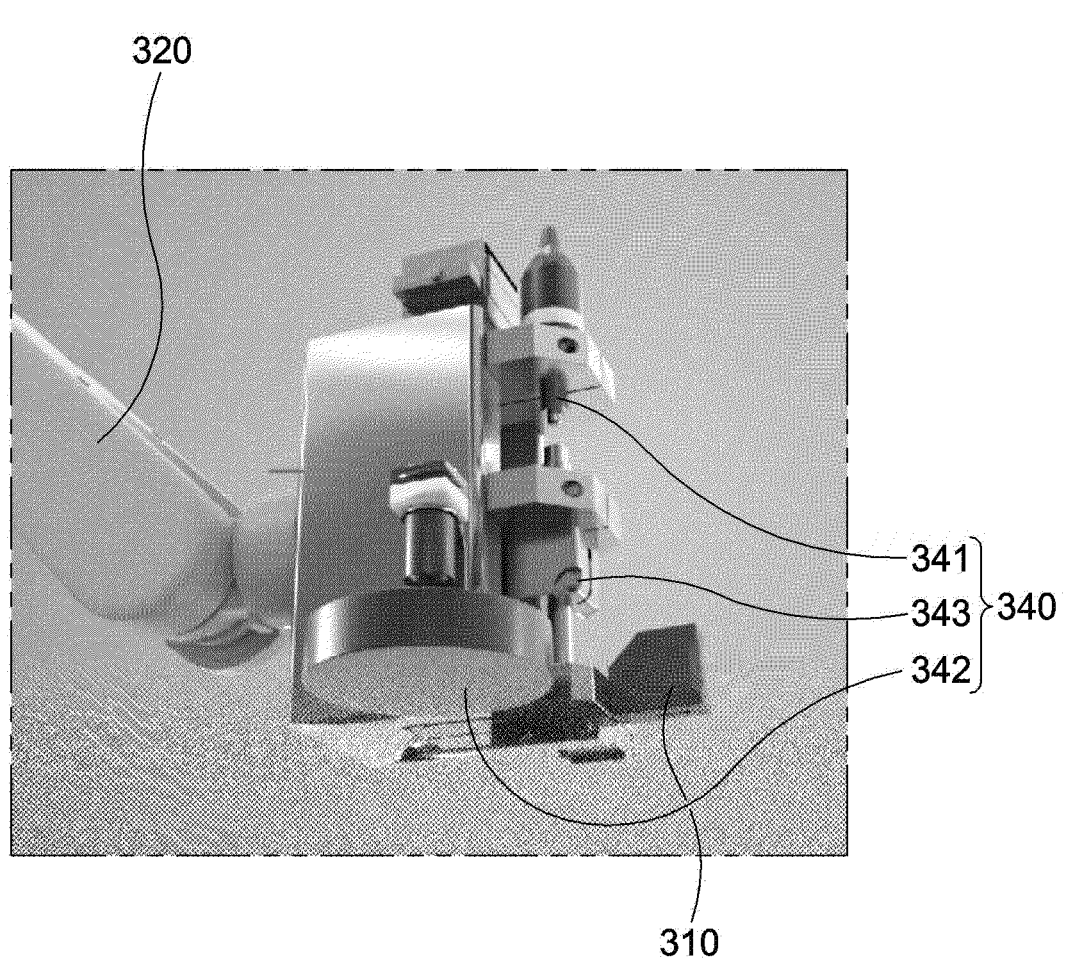
FIG. 4 is detail view illustrating a third installation arm of a bolting robot according to an embodiment of the present invention.

To this end, the bolting robot 300 may include a third detection sensor 310 sensing an insertion hole 13 to which the fastening means 40 is inserted, a third installation arm 320 moving the fastening means 40 to the insertion hole 13, and a third transportation means 330 moving the third installation arm 320 (refer to FIG. 4).

In general, the fastening means 40 is a bolt 41, and the insertion hole 13 is defined in the pad 20 and the floor 30. In this case, the bolting robot 300 may include a bolting part 340 fastening the bolt 41 to the insertion hole 13.

The construction robot including the pad installation robot 100, the floor installation robot 200, and the bolting robot 300 may include a position sensor 410 and a distance sensor 420.

Since the unmanned access floor construction system according to the present invention includes a plurality of construction robots, a position and a distance of an individual construction robot and contents of a work to be performed at the corresponding position may be controlled through the position sensor 410 and the distance sensor 420 mounted to each construction robot.

The operation module contained in the control server 1 defines operation contents of the construction robot by using information generated in the position sensor 410 and the distance sensor 420 of the construction robot.

Hereinafter, a method for constructing an access floor by using the unmanned access floor construction system according to the present invention will be described.

The method for constructing the access floor according to the present invention may include a first step S100 of constructing an installation frame 10, an elevator 50, and a peripheral slab 60, a second step S200 of moving a construction robot to the peripheral slab 60 by using the elevator 50, a third step S300 of attaching a pad 20 to a frame 10 by using a pad installation robot 100, a fourth step S400 of mounting a floor 30 to the pad 20 by using a floor installation robot 200, and a fifth step S500 of fastening the floor 30 and the pad 20 by inserting a bolt 41 to an insertion hole 13 using a bolting robot 300 (refer to FIGS. 5 to 22).

In this case, the fourth step S400 may include an alignment step S410 of allowing a transportation unit 210 and an installation unit 220 to approach a mounting position 12 and a mounting step S420 of lifting the floor 30 loaded on the transportation unit 210 by a second installation arm 222 and mounting the floor 30 to the mounting position 12.

The method for constructing the access floor according to the present invention performs a minimum construction including only the elevator 50 for movement of the construction robot and the peripheral slab 60 formed at the periphery of the installation frame 10 by manpower and then performs the construction for forming the access floor by the construction robot to exhibit an effect of increasing a quality and efficiency of the access floor construction and remarkably decreasing a risk of occurrence of a safety accident or damage of the worker.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

INDUSTRIAL APPLICABILITY

The present invention has industrial applicability in relation to the construction of the access floor.

10: Installation frame
20: Pad
30: Floor
100: Pad installation robot
200: Floor installation robot
300: Bolting robot

The invention claimed is:

1. An unmanned access floor construction system comprising an installation frame, a pad attached to the installation frame, and a floor fastened to the pad, comprising:
   a construction robot connected to a control server by wired or wireless communication
   wherein the construction robot comprises:
   a pad installation robot configured to attach the pad to the installation frame, the pad installation robot including a first detection sensor configured to sense an installation position of the pad on the installation frame and a first installation arm configured to move the pad to the installation position;
   a floor installation robot configured to mount the floor on the pad, the floor installation robot including a second detection sensor configured to sense a mounting position of the floor, the mounting position corresponding to the installation position of the pad; and
   a bolting robot configured to fasten the pad and the floor by using a fastener, the fastening being performed after the floor is mounted on the pad.

2. The unmanned access floor construction system of claim 1, wherein the pad installation robot comprises:
   a first transporter configured to move the first installation arm.

3. The unmanned access floor construction system of claim 2, further comprising an adhesive supply part configured to supply an adhesive to a bottom surface of the pad.

4. The unmanned access floor construction system of claim 3, wherein the first installation arm comprises:
   a first gripper configured to suction the pad; and
   a second gripper configured to surround a side surface and a bottom surface of the pad suctioned to the first gripper.

5. The unmanned access floor construction system of claim 4, wherein the first gripper uses a vacuum suction method, and
   the second gripper comprises:
   a first guide part protruding from an end of the first installation arm in a downward direction; and
   a second guide part extending from the first guide part in an inward direction,
   wherein the first guide part is hinged with respect to the first installation arm.

6. The unmanned access floor construction system of claim 5, wherein the second guide part is:
   hinged in the inward direction in a state in which the pad is suctioned to the first gripper; and
   hinged in an outward direction in a state in which the pad is separated from the first gripper.

7. The unmanned access floor construction system of claim 6, wherein the pad installation robot further comprises a main body to which the first install arm is mounted,
   wherein the adhesive supply part is disposed on the main body, and
   a discharge hole through which the adhesive is discharged is defined in the adhesive supply part.

8. The unmanned access floor construction system of claim 6, wherein the floor installation robot comprises:
   a transportation unit configured to transport the floor in a loaded state; and
   an installation unit configured to mount the floor disposed on the transportation unit to the pad.

9. The unmanned access floor construction system of claim 8, wherein the installation unit comprises:
   the second detection sensor configured to sense the mounting position of the floor;
   a second installation arm configured to move the floor to the mounting position; and
   a second transporter configured to move the second installation arm.

10. The unmanned access floor construction system of claim 9, wherein the bolting robot comprises:
   a third detection sensor configured to sense an insertion hole to which the fastener is inserted;
   a third installation arm configured to move the fastener to the insertion hole; and a third transporter configured to move the third installation arm.

11. The unmanned access floor construction system of claim 10, wherein the fastener is a bolt, the insertion hole is defined in the pad and the floor, and the unmanned access floor construction system further comprises a bolting part configured to fasten the bolt to the insertion hole.

12. The unmanned access floor construction system of claim 11, wherein the construction robot comprises:

a position sensor; and a distance sensor.

13. A method for constructing an access floor by using the unmanned access floor construction system of claim 12, comprising:

a first step of constructing the installation frame, an elevator, and a peripheral slab; and a second step of moving the construction robot to the peripheral slab by using the elevator.

14. The method of claim 13, further comprising, after the second step:

a third step of attaching the pad to the frame by using the pad installation robot;

a fourth step of mounting the floor to the pad by using the floor installation robot; and a fifth step of fastening the floor to the pad by inserting the bolt to the insertion hole using the bolting robot.

15. The method of claim 14, wherein the fourth step comprises:

an alignment step of allowing the transportation unit and the installation unit to approach the mounting position; and a mounting step of lifting the floor loaded on the transportation unit by the second installation arm and mounting the floor to the mounting position.

* * * * *